(12) United States Patent
Alford, Jr. et al.

(10) Patent No.: US 7,703,048 B2
(45) Date of Patent: Apr. 20, 2010

(54) MANAGING FLEXIBLE EVENTS WITHIN AN ELECTRONIC CALENDAR

(75) Inventors: Jack A. Alford, Jr., Austin, TX (US); Paul T. Arellanes, Austin, TX (US); Jeffrey D. George, Austin, TX (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 11/426,770

(22) Filed: Jun. 27, 2006

(65) Prior Publication Data

US 2007/0300163 A1 Dec. 27, 2007

(51) Int. Cl.
*G06F 3/048* (2006.01)
*G05B 19/418* (2006.01)

(52) U.S. Cl. ............... 715/963; 715/747; 715/764; 715/785; 715/844; 705/8

(58) Field of Classification Search ............... 715/963, 715/747, 764, 785, 844; 705/8
See application file for complete search history.

(56) References Cited

U.S. PATENT DOCUMENTS

| | | | |
|---|---|---|---|
| 5,899,979 A * | 5/1999 | Miller et al. | 705/9 |
| 6,085,166 A | 7/2000 | Beckhardt | |
| 6,686,939 B1 | 2/2004 | Haynes | |
| 7,343,312 B2 * | 3/2008 | Capek et al. | 705/8 |
| 7,385,875 B2 * | 6/2008 | May et al. | 368/10 |
| 2001/0014867 A1 * | 8/2001 | Conmy | 705/9 |
| 2003/0103415 A1 * | 6/2003 | Bates et al. | 368/28 |
| 2003/0149606 A1 * | 8/2003 | Cragun et al. | 705/8 |
| 2003/0204474 A1 * | 10/2003 | Capek et al. | 705/64 |
| 2004/0261013 A1 * | 12/2004 | Wynn et al. | 715/511 |
| 2005/0065832 A1 * | 3/2005 | Virta | 705/8 |
| 2005/0101335 A1 * | 5/2005 | Kelly et al. | 455/456.3 |

(Continued)

FOREIGN PATENT DOCUMENTS

EP 0537100 A 4/1993

(Continued)

OTHER PUBLICATIONS

Salahshour, et al., Calendar Scheduling Based on User-Defined Criteria, Research Disclosure, May 1993, No. 5, Kenneth Mason Publications Ltd. England, 1 page.

(Continued)

*Primary Examiner*—Adam L Basehoar
*Assistant Examiner*—Rashawn Tillery
(74) *Attorney, Agent, or Firm*—Matthew W. Baca; Amy J. Pattillo

(57) ABSTRACT

A method, system, and program are provided for managing flexible events within an electronic calendar. A calendaring controller schedules fixed events requiring a fixed time slots and flexible events that are flexible for scheduling over a particular time period for a particular duration, wherein the particular time period is greater than the particular duration. The calendaring controller sets each flexible event at a particular time slot within the particular time period for the particular duration. Responsive to the calendaring controller detecting a request for a new event for an additional time slot overlapping the particular time slot, the calendaring controller repositions the flexible event to at least one other time slot of the particular duration during the particular time period to allow for scheduling the new event during the additional time slot.

19 Claims, 5 Drawing Sheets

U.S. PATENT DOCUMENTS

2005/0102245 A1    5/2005   Edlund et al.
2006/0041460 A1*   2/2006   Aaron ........................... 705/8
2007/0260503 A1*  11/2007   Pan et al. ....................... 705/9

OTHER PUBLICATIONS

Dawson, et al, Graphical Way to Select Meeting Start/End Times, Research Disclosure, Nov. 1992, No. 343, Kenneth Mason Publications Ltd, England, 1 page.

Manthuruthil, Methodology for Calendar Scheduling Based on Event Priority, Technical Disclosure Bulletin, International Business Machines Corporation, v.37, No. 4A, Apr. 1994, pp. 281-282.

Brewer, Analog Clock Face with Highlighted Reserved Time Areas, Technical Disclosure Bulletin, International Business Machines Corporation, n 3a, Sep. 1990, pp. 405-406.

Vincent, Reusing a Standard Set of Relative Calendar Events, , Reusing a Standard Set of Relative Calendar Events, Technical Disclosure Bulletin, International Business Machines Corporation, n2, Jul. 1991, pp. 477-478.

* cited by examiner

| FLEXIBLE EVENT 600 | |
|---|---|
| TITLE | "LUNCH" |
| DATE | 03/06/2008 |
| DURATION | 45 MINUTES |
| FLEXIBLE SCHEDULING PERIOD | 11:00 AM - 1:30 PM |
| MIN BLOCK SIZE | N/A |
| OTHER PARTICIPANTS | STEVE |
| PRIORITY | 1 |
| CATEGORY | BREAK |
| QUEUE TIME | N/A |

*Fig. 6*

MANAGING FLEXIBLE EVENTS WITHIN AN ELECTRONIC CALENDAR

BACKGROUND OF THE INVENTION

1. Technical Field

The present invention relates generally to electronic calendars and in particular, to managing flexible events in an electronic calendar. Further, the present invention relates to managing positioning of flexible events in an electronic calendar to provide more scheduling options for other events in the electronic calendar.

2. Description of the Related Art

Electronic calendaring systems continue to replace the traditional paper calendaring systems of the past. One advantage of electronic calendaring is that a user may make changes to an electronic schedule without needing to erase or mark through a page in the calendaring system. Another advantage of many electronic calendaring systems is that multiple users, such as business colleagues, can access one another's electronic calendars via a network and schedule meetings or other events in one another's electronic calendars. For example, one user may search for time that is not already scheduled in the other user's electronic calendar and add a meeting to the previously unscheduled time in the other user's electronic calendar.

While electronic calendaring systems include many advantages, a limitation of electronic calendaring systems is that calendaring systems only track scheduled events in fixed time slots. Thus, for a user to block other users from scheduling in an electronic calendar, the user must either specifically schedule an event during a time slot or block the time slot from being filled by other users. This limitation of requiring fixed slot scheduling is apparent when it is considered that there are actual events in a user's daily schedule that are not fixed, but are flexible and could occur within a particular time period, rather than during a particular time slot. For example, a user may need 2 hours in a day to write a report sometime during the day, but for the user to schedule the 2 hours in an electronic calendaring system, the user must actually fix the 2 hours to a particular 2 hour time slot. Once the user schedules the 2 hours to a particular time slot, that time slot is no longer available for another user to schedule a meeting, even though the user's schedule includes other open 2 hour time slots.

Therefore, in view of the foregoing, there is a need for a method, system, and program for managing electronic calendaring systems to include flexible scheduled items with set duration, but with flexible start and end times within a schedule to improve scheduling flexibility of other schedule items within an electronic calendar.

SUMMARY OF THE INVENTION

Therefore, the present invention provides management of flexible events in an electronic calendar. In particular, the present invention provides a method, system, and program for managing positioning of flexible events in an electronic calendar to provide more scheduling options for other events in the electronic calendar.

In one embodiment, a calendaring controller enables scheduling of at least one fixed event requiring a first time slot on a particular day and at least one flexible event that is flexible for scheduling over a particular time period for a particular duration, wherein the particular time period is greater than the particular duration. The calendaring controller sets the flexible event at a second time slot within the particular time period for the particular duration. Responsive to the calendaring controller detecting a request for a new event for an additional time slot overlapping the second time slot, the calendaring controller repositions the flexible event to at least one other time slot of the particular duration during the particular time period to facilitate scheduling the new event during the additional time slot.

The calendaring controller may be integrated into a client system communicatively connected with other client systems or in a server system communicatively connected with multiple client systems. A user at one client system may request the new event be added to the electronic calendar of another user associated with an electronic calendar at another client system or at a server system that facilitates electronic calendaring management of multiple electronic calendars.

A graphical representation of the electronic calendar is displayed. The graphical representation depicts the fixed event with a first graphical attribute representing fixed events. In addition, the graphical representation depicts the flexible event with a second graphical attribute representing flexible events and a third graphical attribute representing the boundaries of the particular flexible scheduling time period for the flexible event. The new event may be a fixed event or a flexible event and is graphically represented by a graphical attribute indicating whether the new event is a fixed event or flexible event.

A flexible event may include a minimum blocking size, where the minimum blocking size specifies a minimum time period for each separate time slot set for the flexible event if the flexible event is divided into multiple separate time slots within the particular time period. In particular, when the new event time slot overlaps the current time slot set for the flexible event and no contiguous time slot within the flexible scheduling time period is available for the duration of the flexible scheduling time period, the duration of the flexible event is distributed across multiple blocks within the flexible scheduling time period, wherein each block is at least the minimum blocking size.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 is an illustrative diagram depicting one example of an interface for a user to enter the parameters of a flexible event.

DETAILED DESCRIPTION OF THE PREFERRED EMBODIMENT

Figure 1:
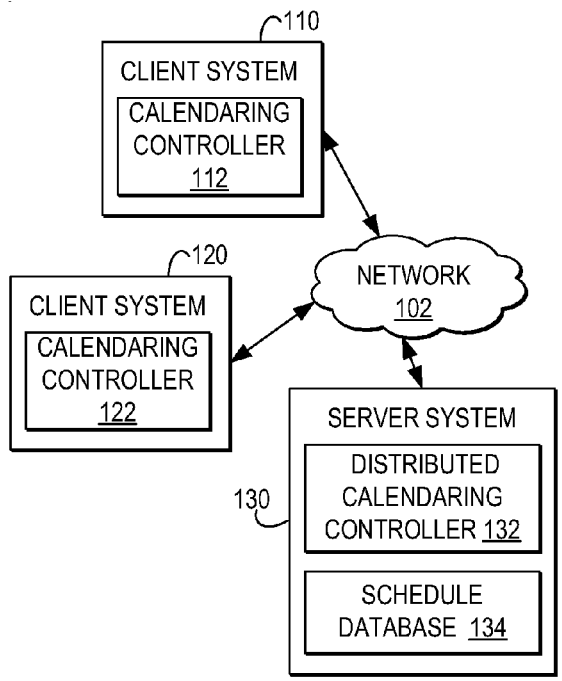
FIG. 1 is a block diagram illustrating a distributed electronic calendaring system including flexible event scheduling.

Referring now to FIG. 1, a block diagram illustrates a distributed electronic calendaring system including flexible event scheduling. It will be understood that the embodiment depicted does not imply structural or architectural limitations on a distributed electronic calendaring system. In addition, it will be understood that additional or alternate network environments may be implemented.

As illustrated, a client system 110, a client system 120, and a server system 130 are communicatively connected via a network 102. Network 102 may represent multiple types of networks including, but not limited to, intranets, Internets, and telephone networks, over multiple types of connections including, but not limited to, wired and wireless connections.

Client system 110 includes a calendaring controller 112 and client system 120 includes a calendaring controller 122. Calendaring controllers 112 and 122 each facilitate maintenance of an electronic calendar for a particular user or group of users. In particular, each of calendaring controllers 112 and 122 facilitate user entry of fixed and flexible calendaring events to an electronic calendar. In addition, each of calendaring controllers 112 and 122 may facilitate user selection to schedule a meeting with other users and to add the meeting as a scheduled event in the other users' electronic calendars.

In one embodiment, calendaring controllers 112 and 122 communicate via network 102 in a peer-to-peer architecture. In one example, if a first user at client system 110 selects to schedule a meeting with a second user whose calendar is managed by calendaring controller 122, then calendaring controller 112 communications with calendaring controller 122 to locate whether the second user has time available for scheduling the meeting and to schedule the event in the electronic calendar of the second user if time is available for scheduling the meeting. It will be understood that any number of client systems may communicate with one another via network 102 for event scheduling and a client system may communicate with multiple other client systems to schedule an event with multiple other users.

In another embodiment, distributed calendaring controller 132 of server system 130 manages communication between calendaring controller 112 and 122 in a client-server architecture. In one example, if a first user at client system 110 selects to schedule a meeting with a second user, calendaring controller 112 communicates with distributed calendaring controller 132 with the scheduling request. Distributed calendaring controller 132 may store the electronic calendar for the first and second users locally in schedule database 134 or may access each of the electronic calendars from client systems 110 and 120. Either way, distributed calendaring controller 132 determines whether the second user has time available for scheduling the meeting and schedules the event in the electronic calendars of the first and second user at the time mutually available for the meeting. It will be understood that distributed calendaring controller 132 may manage scheduling for multiple users or groups of users requesting scheduling from multiple systems, including but not limited to, client systems 110 and 120. In addition, it will be understood that distributing calendaring controller 132 and schedule database 134 may be distributed across multiple systems. Further, it will be understood that distributed calendaring controller 132 and schedule database 134 may be implemented with other functions and services available via a network including, but not limited to, telephony service, electronic mail, instant messaging, and instant messaging bots. Moreover, it will be understood that distributed calendaring controller 132 may communicate with other distributed calendaring controllers at other server systems or via other service providers, for example, and facilitate scheduling events in electronic calendars controlled by other distributed calendaring controllers.

In one example, where server system 130 maintains electronic calendars for users in schedule database 134, a user may log in to server system 130 at client system 110 or client system 120 through calendaring controllers 112 and 122, respectively, where calendaring controllers 112 and 122 may represent stand-alone software for interfacing with distributed calendaring controller 132 or a web browser or other network interfacing software or controllers enabled to access server system 130 and interface with distributed calendaring controller 132.

Figure 2:
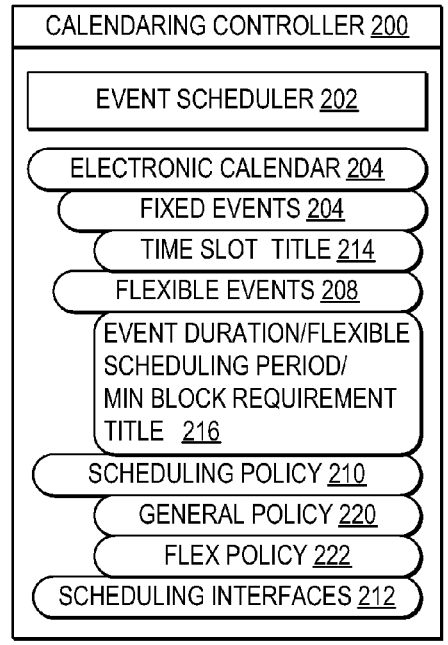
FIG. 2 is a block diagram depicting examples of components of a calendaring controller.

Referring now to FIG. 2, a block diagram illustrates examples of components of a calendaring controller. It will be understood that additional or alternate components may be implemented in a calendaring controller.

As illustrated, calendaring controller 200 includes an event scheduler 202 for controlling the viewing of an electronic calendar and the scheduling of events at a user's electronic calendar and with other users. Calendaring controller 200 accesses a user's electronic calendar 204, which includes multiple event entries categorized either as fixed events 206 and flexible events 208. When calendaring controller 200 is implemented in a server system, electronic calendar 204 may be separate stored, with other electronic calendars, in schedule database 134, for example.

First, event scheduler 202 controls viewing of electronic calendar 204 via one of scheduling interfaces 212. For example, scheduling interfaces 212 may include options for viewing electronic calendar 204 by day, by week, by month, or by other time period, event type, or other characteristic. In addition, scheduling interfaces 212 may graphically distinguish between fixed events 206 and flexible events 208 and may graphically indicate the full time period specified for scheduling a flexible event. While viewing electronic calendar 204, scheduling interfaces 212 may provide for a user to select graphical representations of events in time slots and place the events in other time slots or to select a time slot and add a new fixed or flexible event. In addition, a user may select to adjust the bounds of the time slot for a fixed event, the duration of a flexible event, or of the flexible scheduling period for a flexible event. It will be understood that additional time boundaries and characteristics of graphical representations of events can be selected and adjusted. It will be understood that in addition to graphical interfaces, scheduling interfaces 212 may facilitate user viewing and adjustment to entries in electronic calendar 204 using voice commands, text, commands, or other input.

Second, event scheduler 202 controls updating and managing each event entry in electronic calendar 204. In particular, electronic calendar 204 includes events categorized under fixed events 206 and flexible events 208, however, it will be understood that additional event categorizations may be implemented.

Each fixed event entry, as illustrated at reference numeral 214, includes a time slot and a title. In addition, although not depicted, a fixed event entry may include additional information such as the event category, the location of the event, the participants in the event, materials required for the event, contact information for the event, and other information provided for the event.

Each flexible event entry, as illustrated at reference numeral 216, includes an event duration, a flexible scheduling period, a minimum block requirement, and a title. The event duration indicates the full duration of the event. The flexible scheduling period indicates the time period during which the event needs to be scheduled. The minimum block requirement indicates the minimum amount of time required for each block of the event if the event can be distributed into multiple scheduled events throughout the flexible scheduling period. In addition, it will be understood that as with fixed events, additional information provided for the event may be included with each event entry.

Third, event scheduler 202 receives requests for scheduling events, including requests from other calendaring controllers to schedule meetings, and dynamically schedules events and adjusts the position of flexible events according to scheduling policy 210. Scheduling policy 210 may include general scheduling policy 220, such as, but not limited to, rules for controlling which users may schedule events in electronic calendar 204, rules for controlling which users may request meetings to be scheduled in electronic calendar 204, rules for prioritizing different categories of events, and other rules for controlling the viewing, scheduling, and distribution of electronic calendar 204. In addition, scheduling policy 210 may include flexible event scheduling (flex) policy 222. Flex policy 222 may include, for example, rules for selecting the positioning of a flexible event within the flexible scheduling period, rules for graphically distinguishing flexible events, rules for prioritizing flexible events with overlapping flexible scheduling periods, rules for prioritizing flexible events and fixed events, rules for changing a flexible event into a fixed event, rules for recurrent flexible events, and other rules for handling viewing, scheduling, distribution, and dynamic adjustment of flexible events in electronic calendar 204.

For example, a user may select rules in flex policy 222 for selecting to always place a flexible event in the median position of a flexible scheduling period and upon adjustment, to place the flexible event in the first available position of the flexible scheduling period. In another example, a user may select rules in flex policy 222 for graphically distinguishing flexible events with particular colorings or shadings visually distinguishable from the colorings or shadings of fixed events. In yet another example, flex policy 222 may include preferences for prompting a user when event scheduler 202 adjusts the position of flexible events within the flexible scheduling period and preferences for a particular output interface at which to prompt the user with the dynamic position adjustment alerts.

In one example, a user requests to add a new flexible event to electronic calendar 204. In one example, a user may specify the event duration and the minimum block requirement and request that event scheduler 202 indicate the available period over a particular day or time period for setting as the flexible scheduling period. Event scheduler 202 filters electronic calendar 204 and returns the available period to the user. The user may then select to adjust the bounds of the available period and set the available period as the flexible scheduling period for the flexible event. It will be understood that in other examples, a user may specify other parameters, such as the flexible scheduling period, and request that event scheduler 202 indicate other available parameters, such as the total time currently available during the flexible scheduling period.

In another example, another user requests to add a fixed meeting at a particular time period to electronic calendar 204.

Event scheduler 202 detects that the meeting time overlaps at least a portion of a flexible event as it is currently set. Event scheduler 202 detects whether the flexible event can be moved to a different position within the flexible scheduling period to accommodate the fixed event. If sufficient time is available to move the flexible event to accommodate the fixed event, event scheduler 202 dynamically adjusts the position of the flexible event according to flex policy 222 and adds the fixed event to electronic calendar 204. In addition, if the new position of the flexible event is the only position remaining within the flexible scheduling period for the event, following flex policy 222, electronic scheduler 202 may convert the flexible event into a fixed event with a time period of the current position.

In yet another example, another user requests to add a flexible meeting to electronic calendar 204. Event scheduler 202 detects whether the flexible scheduling period and event duration are available in electronic calendar 204 and may adjust the parameters of the flexible meeting to fit the currently available times in event scheduler 202. For example, another user may request to schedule a thirty minute meeting with the user at any time between 2:00 PM and 4:00 PM, where event scheduler 202 detects first whether thirty minutes are available for scheduling an event between 2:00 and 4:00 and if time is available, sets the event within a thirty minute slot available and returns a response to the requesting user with the set time period. In a graphical display of electronic calendar 204, the flexible scheduling period for the event may be graphically distinguished from a flexible scheduling period for a flexible event scheduled by the user. If event scheduler 202 dynamically adjusts the position of a flexible event requested by another user, event scheduler 202 communicates the adjustment to the requesting user and may provide additional alerts to the requesting user.

Figure 3:
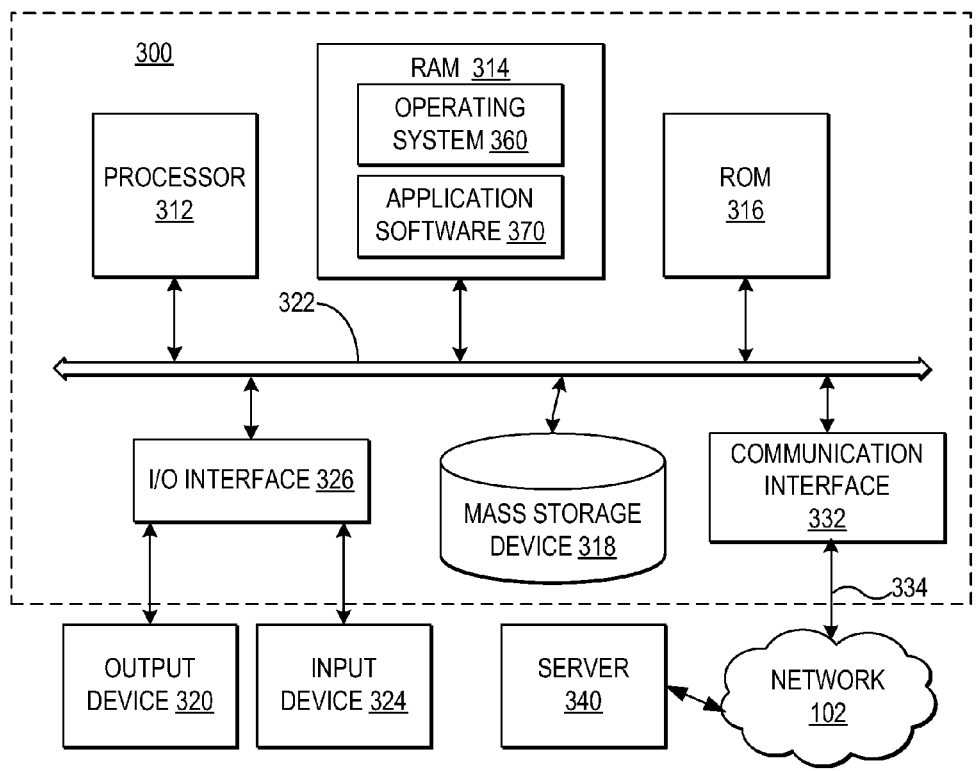
FIG. 3 is a block diagram illustrating an example of a computer system in which the present invention may be implemented.

With reference now to FIG. 3, a block diagram depicts one embodiment of a computing system in which the present invention may be implemented. The present invention may be executed in a variety of systems, including a variety of computing systems, such as computing system 300, communicatively connected to a network, such as network 102. For example, any of client systems 110 and 120 and server system 130 may be implemented using a computing system or grouping of computing systems, such as computing system 300.

Computer system 300 includes a bus 322 or other communication device for communicating information within computer system 300, and at least one processing device such as processor 312, coupled to bus 322 for processing information. Bus 322 preferably includes low-latency and higher latency paths that are connected by bridges and adapters and controlled within computer system 300 by multiple bus controllers. When implemented as a server, computer system 300 may include multiple processors designed to improve network servicing power. Where multiple processors share bus 322, additional controllers (not depicted) for managing bus access and locks may be implemented.

Processor 312 may be a general-purpose processor such as IBM's PowerPC™ processor that, during normal operation, processes data under the control of an operating system 360, application software 370, middleware (not depicted), and other code accessible from a dynamic storage device such as random access memory (RAM) 314, a static storage device such as Read Only Memory (ROM) 316, a data storage device, such as mass storage device 318, or other data storage medium. In one embodiment, the operations performed by processor 312 may control management of an electronic calendar as depicted in the operations of flowchart of FIG. 7 and other operations described herein. Operations performed by processor 312 may be requested by operating system 360, application software 370, middleware or other code or the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 300 to perform a process according to the present invention. The term "machine-readable medium" as used herein includes any medium that participates in providing instructions to processor 312 or other components of computer system 300 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 300 can read and which is suitable for storing instructions. In the present embodiment, an example of a non-volatile medium is mass storage device 318 which as depicted is an internal component of computer system 300, but will be understood to also be provided by an external device. Volatile media include dynamic memory such as RAM 314. Transmission media include coaxial cables, copper wire or fiber optics, including the wires that comprise bus 322.

Moreover, the present invention may be downloaded or distributed as a computer program product, wherein the program instructions may be transferred from a remote computer such as a server 340 to requesting computer system 300 by way of data signals embodied in a carrier wave or other propagation medium via network 102 to a network link 334 (e.g. a modem or network connection) to a communications interface 332 coupled to bus 322. Communications interface 332 provides a two-way data communications coupling to network link 334 that may be connected, for example, to a local area network (LAN), wide area network (WAN), or directly to an Internet Service Provider (ISP). In particular, network link 334 may provide wired and/or wireless network communications to one or more networks, such as network 102. Further, although not depicted, communication interface 332 may include software, such as device drivers, hardware, such as adapters, and other controllers that enable communication. When implemented as a server, computer system 300 may include multiple communication interfaces accessible via multiple peripheral component interconnect (PCI) bus bridges connected to an input/output controller, for example. In this manner, computer system 300 allows connections to multiple clients via multiple separate ports and each port may also support multiple connections to multiple clients.

Network link 334 and network 302 both use electrical, electromagnetic, or optical signals that carry digital data streams. The signals through the various networks and the signals on network link 334 and through communication interface 332, which carry the digital data to and from computer system 300, may be forms of carrier waves transporting the information.

In addition, computer system 300 may include multiple peripheral components that facilitate input and output. These peripheral components are connected to multiple controllers, adapters, and expansion slots, such as input/output (I/O) interface 326, coupled to one of the multiple levels of bus 322. For example, input device 324 may include, for example, a microphone, a video capture device, a body scanning system, a keyboard, a mouse, or other input peripheral device, communicatively enabled on bus 322 via I/O interface 326 controlling inputs. In addition, for example, a display device 320 communicatively enabled on bus 322 via I/O interface 326 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 3 may vary. Furthermore, those of ordinary skill in the art will appreciate that the depicted example is not meant to imply architectural limitations with respect to the present invention.

Figure 4:
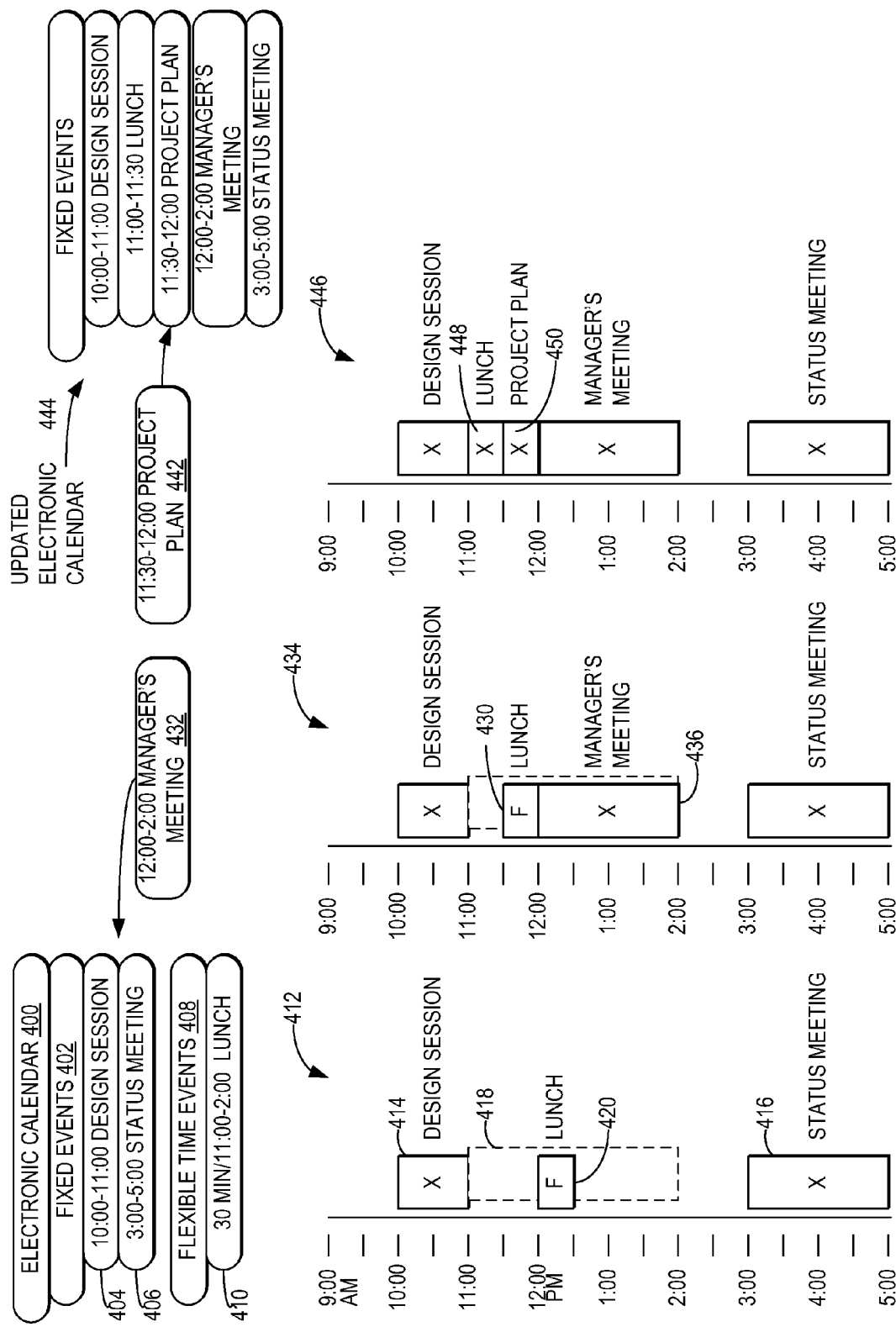
FIG. 4 is an illustrative diagram depicting one example of a graphical representation of scheduled events in an electronic calendar including a flexible event not enabled for blocking.

Referring now to FIG. 4, an illustrative diagram depicts one example of a graphical representation of scheduled events in an electronic calendar including a flexible event not enabled for blocking. In the example, initially, electronic calendar 400 includes fixed events 402 of an event 404 from 10:00-11:00 titled "design session" and an event 406 from 3:00-5:00 titled "status meeting". In addition, flexible events 408 includes an event 410 of a duration of 30 minutes, with a flexible scheduling period from 11:00-2:00, without a blocking option set, and titled "lunch". A graphical representation of fixed electronic calendar 400, as illustrated at reference numeral 412, illustrates the events as viewed between 9 AM and 5 PM on a particular day. In the example, fixed event 402 is represented graphically at reference numeral 414 and fixed event 404 is represented graphically at reference numeral 416, where each of the graphical representations includes an "X" in a boxed time period to indicate that the events are fixed. In addition, in the example, flexible event 410 is represented graphically by a set time period of the required duration period at reference numeral 420, where the graphical representation includes an "F" in the boxed time period to indicate that the event is flexible, and represented graphically by a flexible scheduling period at reference numeral 418, where the bounds of the flexible scheduling period are indicated by a dotted box. The position of the duration period, as indicated at reference numeral 420, in the example, is selected according to flexible event scheduling policy 222 which indicates a preference to place an event titled "lunch" initially at 12:00 if available in the flexible scheduling period. It will be understood that the use of an "X" to indicate a fixed event and an "F" to indicate a flexible event are merely examples of graphical indicators used to distinguish between the graphical representation of different types of events; in alternate embodiments, other types of graphical indicators may be implemented to distinguish fixed events from flexible events.

Next, a new fixed event 432 of a manager's meeting from 12:00-2:00 is received for a user's calendar. The event controller detects that flexible event 410 is currently set in the 12:00-12:30 slot, but that there is other available time within the flexible scheduling period for setting the flexible event. Therefore, the event controller adds fixed event 432 to electronic calendar 400 and updates the graphical representation of electronic calendar 400, as illustrated at reference numeral 434. In particular, the updated graphical representation of electronic calendar 400 shifts the position of flexible event 410 to a time period from 11:30-12:00 within the flexible scheduling period, as illustrated at reference numeral 430 and adds fixed event 432 to the time slot from 12:00-2:00 as illustrated at reference numeral 436. It will be understood that the event scheduler selects the 11:30-12:00 position for the representation of flexible event 410 according to flexible event scheduling policy 222.

Thereafter, a new fixed event 442 of a project plan from 11:30-12:00 is received for a user's calendar. The event controller detects that flexible event 410 is current set in the 11:30-12:00 slot, but that there is other available time within the flexible scheduling period for setting the flexible event. However, the available time within the flexible scheduling period is the only time of the duration period of thirty minutes remaining within the flexible scheduling period. Therefore, the event controller adds fixed event 442 to electronic calendar 400 and converts flexible event 410 into a fixed event, as illustrated by the updated electronic calendar at reference numeral 444. In addition, the event controller updates the graphical representation of electronic calendar 400, as illustrated at reference numeral 446, to graphically represent flexible event 410, as converted into a fixed event marked as fixed by an "X" as illustrated at reference numeral 448. In addition, as illustrated at reference numeral 446, the graphical representation of the calendar includes a graphical representation of fixed event 442 as illustrated at reference numeral 450.

Figure 5:
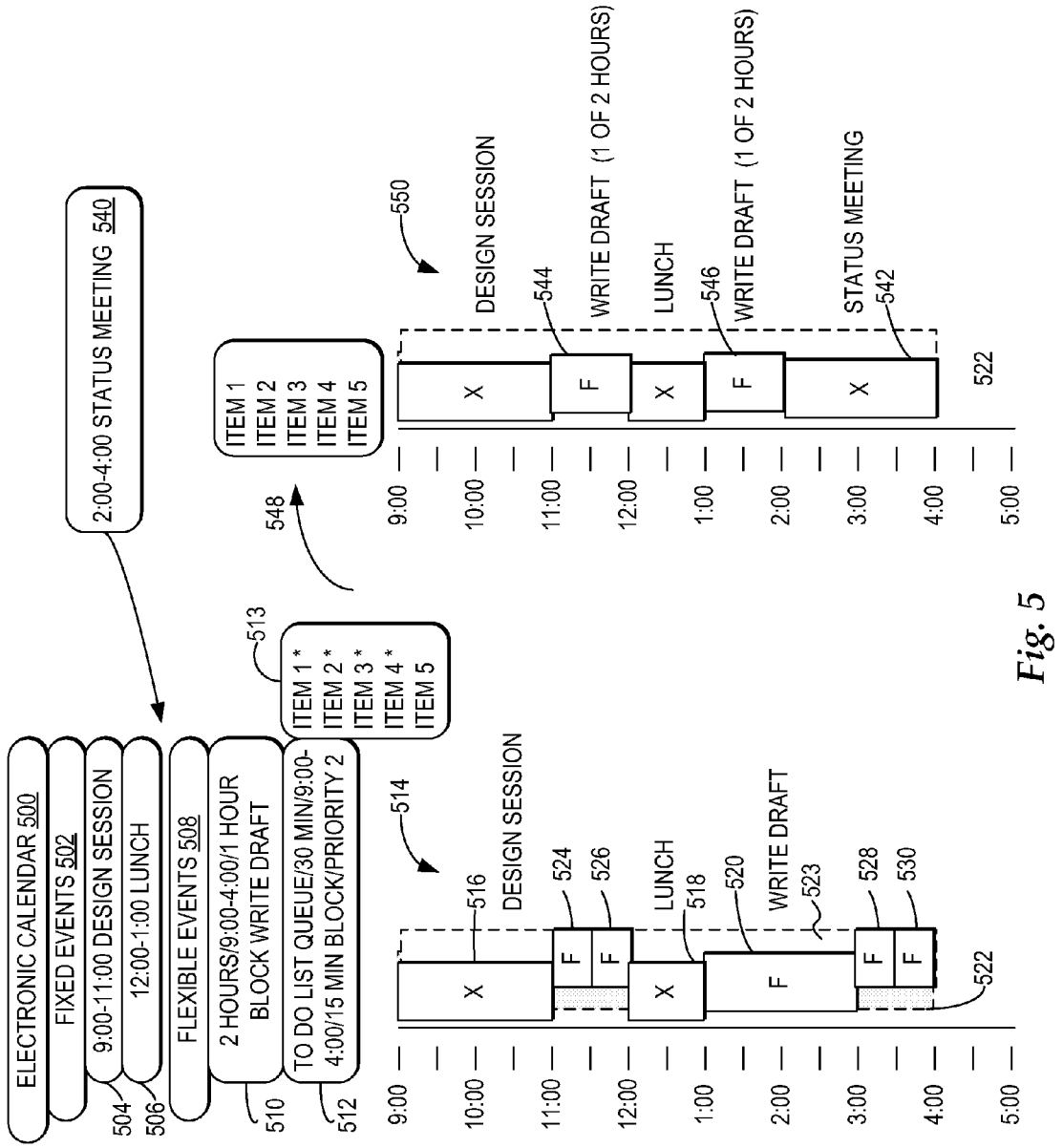
FIG. 5 is an illustrative diagram illustrating one example of a graphical representation of scheduled events in an electronic calendar including a flexible event enabled for blocking.

Referring now to FIG. 5, an illustrative diagram depicts one example of a graphical representation of scheduled events in an electronic calendar including a flexible event enabled for blocking. In the example, initially, electronic calendar 500 includes fixed events 502 of an event 504 from 9:00-11:00 titled "design session" and an event 506 from 12:00-1:00 titled "lunch". In addition, flexible events 508 includes an event 510 of a duration of 2 hours, with a flexible scheduling period from 9:00-4:00 with a minimum block size of 1 hour, titled "write draft" and a queue of events 512 that accesses a list of to do items, each of a duration of thirty minutes, with a flexible scheduling period from 9:00-4:00 with a minimum block size of 15 minutes and a priority level of 2. By setting the priority level to 2, the to do list items can be removed from the schedule and carried over to another day if fixed events or flexible events of a priority level of 1 fill up the schedule. In the example, to do list 513 includes five items, generically listed, however, it will be understood that each to list item may include additional characteristics. In addition, as each item is actually set in the schedule, a star "*" is placed next to the set item, however, it will be understood that as the electronic calendar adjusts, items may be removed from the electronic calendar and queued for another day or other time period. In addition, it is important to note that a user may set a flexible event to link to a to-do list or other listing of events to schedule time to perform.

A graphical representation of electronic calendar 500 includes fixed events 502 and flexible events 508, as illustrated at reference numeral 514. In the example, fixed event 504 is represented graphically at reference numeral 516 and fixed event 506 is represented graphically at reference numeral 518, where each of the graphical representations includes an "X" in a boxed time period to indicate that the events are fixed. In addition, flexible event 510 is graphically represented through a set position at reference numeral 520 and the bounds of the flexible scheduling period are indicated by a dotted box, which is also shaded, at reference numeral 522. Further, the bounds of the flexible scheduling period for flexible event 512 are represented at reference numeral 523 and items 1-4 are represented graphically by multiple set positions 524, 526, 528, and 530, respectively. As illustrated the data storage of electronic calendar 500, the task of "item 5" is still queued because there is not room to place the task in the electronic calendar for that day.

Next, a new fixed event 540 is received, titled "status meeting" from 2:00-4:00. With the request of fixed event 540, the event controller detects that there is sufficient space available for placing the event because flexible event 510 can be reset in blocks and the tasks listed at set positions 524, 526, 528, and 530, can be removed from the electronic schedule for that day and queued for another day. As illustrated at reference numeral 550, responsive to the addition of fixed event 540, the event controller adds fixed event 540 to electronic calendar 500 as illustrated at reference numeral 542, divides flexible event 510 into to blocks illustrated at reference numerals 544 and 546 and places the tasks previously set at positions 524, 526, 528, and 530 into the queue as illustrated at reference numeral 548. In this example, the user selects in flex policy 222 not to set blocked flexible events as fixed events.

It is important to note that in queuing flexible events of a lower priority, the flexible events may include a deadline, where once the deadline passes, the flexible events of lower priority are converted into flexible events of higher priority or into fixed events on a particular day at a particular time. In addition, it is important to note that multiple types of flexible events may be queued, including event requests from other users, where the other user indicates that the event is flexible and could be "worked in" if time is available.

With reference now to FIG. 6, an illustrative diagram depicts one example of an interface for a user to enter the parameters of a flexible event. It will be understood that an electronic calendaring system may provide multiple different types of interfaces for a user to add and adjust flexible events. In one example, a user may trigger graphical interface 600 for entry of a flexible event. In the example, the user may select a title as illustrated at reference numeral 602. In addition, the user may select a date, as illustrated a reference numeral 604, a duration for the event, as illustrated at reference numeral 606, a flexible scheduling period, as illustrated at reference numeral 608, and a minimum block size, as illustrated at reference numeral 610. Further, the user may select other users to invite to participate, as illustrated at reference numeral 612. The user may also select a priority, as illustrated at reference numeral 614 and a category, as illustrated at reference numeral 616. Further, if the event is rated with a priority indicating that the event may be queued, the user may select a queue time period, as illustrated at reference numeral 618.

For aiding the user in selecting parameters of the flexible event, interface 600 may further provide pull-down menus, pull-out calendars, and other selectable listings. For example, a user may select from a pull-down list of other users that the user may select to invite to participate in the event at reference numeral 612.

Figure 7:
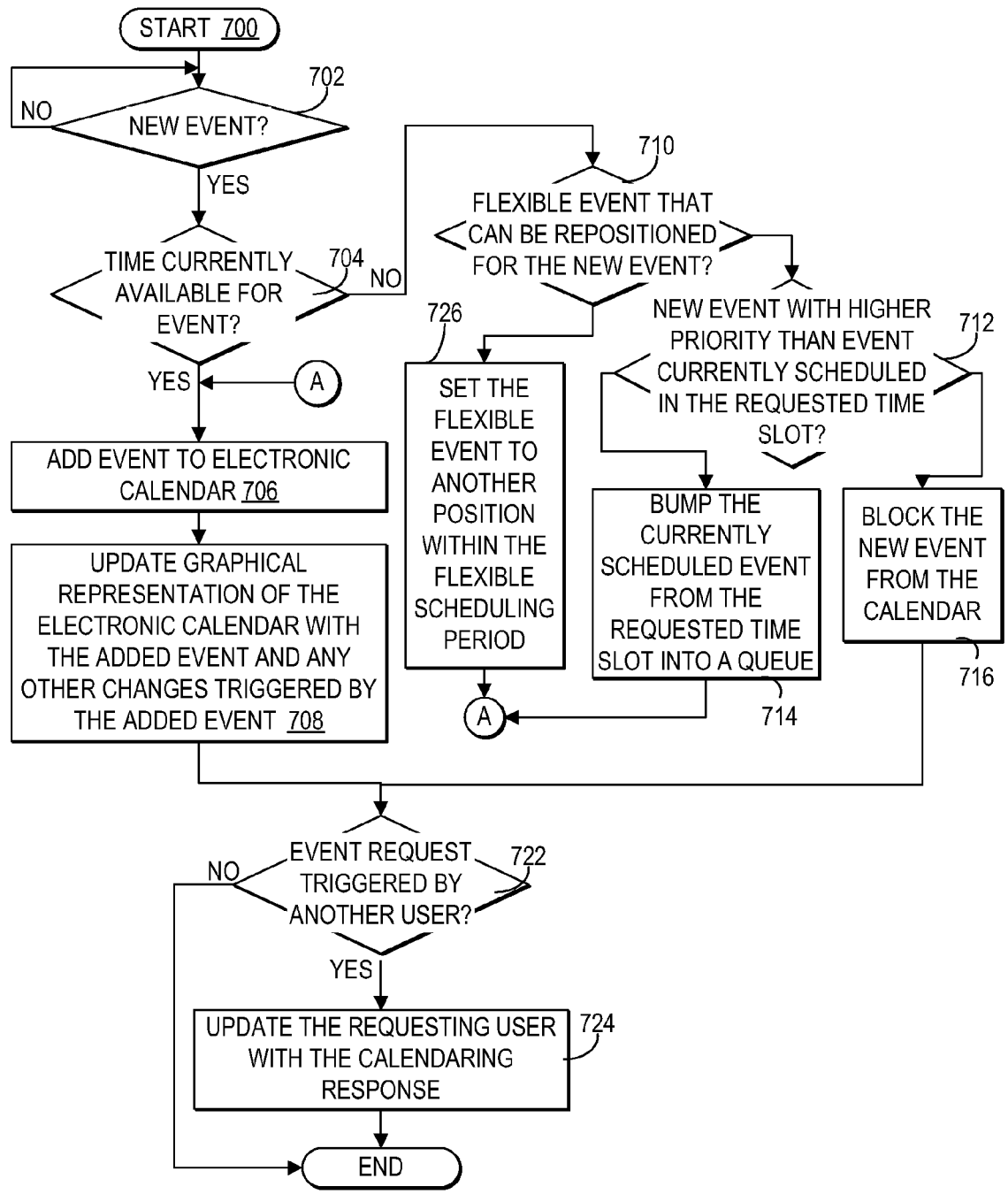
FIG. 7 is a high level logic flowchart illustrating a process and program for controlling an electronic calendar in accordance with the method, system, and program of the present invention.

Referring now to FIG. 7, a high level logic flowchart depicts a process and program for controlling an electronic calendar in accordance with the method, system, and program of the present invention. As illustrated, the process starts at block 700 and thereafter proceeds to block 702. Block 702 depicts a determination whether a new event or event adjustment is detected. If a new event or event adjustment is detected, then the process passes to block 704. Block 704 illustrates a determination whether there is currently time available in the electronic calendar for the new event or adjustment, without adjusting any other parameters. If time is currently available for the event, then the process passes to block 706. Block 706 depicts adding the event to the electronic calendar. Next, block 708 illustrates updating any current display or other output of the electronic calendar with the event and any changes to the electronic calendar triggered by the added event. Thereafter, block 722 depicts a determination whether the new event or event adjustment was received from another calendaring system. If the new event or event adjustment was received from another calendaring system, then the process passes to block 724. Block 724 illustrates updating the other calendaring system with the result of the event request, and the process ends. Otherwise, at block 722, if the new event or event adjustment was not received from another calendaring system, then the process ends.

Returning to block 704, if there is not currently time available in the electronic calendar, then the process passes to block 710. Block 710 depicts a determination whether there is a flexible event currently set in the requested time that can be repositioned. If there is a flexible event currently set in the requested time that cannot be repositioned, then the process passes to block 712. Block 712 illustrates a determination whether the new event or event adjustment has priority over the event currently scheduled in the requested time period. If the new event or event adjustment has priority, then the process passes to block 714. Block 714 depicts moving the event currently scheduled in the requested time period to a rescheduling queue, and the process passes to block 706. Otherwise, at block 712, if the new event or event adjustment does not have priority, then the process passes to block 726. Block 726 illustrates blocking the new event or event adjustment, and the process passes to block 722. In addition to blocking the new event, the event controller may determine alternative times available for the requested event for output to the calendar user or transmission to another user requesting the new event.

Returning to block 710, if there is a flexible event current set in the requested time that can be repositioned, then the process passes to block 716. Block 716 depicts repositioning the flexible event within the other available time within the flexible scheduling period, including dividing the event into blocks if permitted and the available time requires. Next, the process passes to block 706.

While the invention has been particularly shown and described with reference to a preferred embodiment, it will be understood by those skilled in the art that various changes in form and detail may be made therein without departing from the spirit and scope of the invention

What is claimed is:

1. A method for managing scheduling of an electronic calendar, comprising:

triggering, by a calendar controller of a computer system, a graphical interface for a user to enter a flexible event comprising a title of said flexible event, a particular time period for said flexible event, a particular duration for said flexible event, a priority level for said flexible event wherein said priority level specifies a numerical priority and a deadline for said flexible event to remain in a reschedule queue;

scheduling, by said calendar controller, in a particular electronic calendar, at least one fixed event requiring a first time slot on a particular day and said flexible event flexible for scheduling over said particular time period for said particular duration, wherein said particular time period is greater than said particular duration;

setting, by said calendar controller, said flexible event at a second time slot within said particular time period for said particular duration;

responsive to said calendar controller detecting a request for a new event for an additional time slot overlapping said second time slot, determining by said calendar controller whether there is available time for at least one other time slot within said particular time period for said duration of said flexible event;

responsive to detecting a lack of available time for said at least one other time slot, comparing by said calendar controller said priority level assigned to said flexible event with another priority level assigned to said new event;

responsive to detecting said priority level assigned to said flexible event is less than another priority level assigned to said new event, placing by said calendar controller said flexible event in said rescheduling queue to enable scheduling said new event during said additional time slot and rescheduling said flexible event during a new time period;

responsive to detecting an available time for said at least one other time slot before said deadline passes, automatically repositioning by said calendar controller said flexible event to said at least one other time slot of said particular duration during said particular time period to allow for scheduling said new event during said additional time slot; and responsive to only detecting an available time for said at least one other time slot once said deadline passes, converting said flexible event in said rescheduling queue into a fixed type of event for an additional particular day at a particular time and automatically placing said flexible event in said electronic calendar on said additional particular day at said particular time.

2. The method according to claim 1, further comprising:
receiving by said calendar controller said new event from another user, wherein said new event requests said user associated with said particular electronic calendar participate in a meeting with at least one additional user.

3. The method according to claim 1, further comprising:
receiving by said calendar controller said new event at a server maintaining a plurality of electronic calendars, including said particular electronic calendar, from at least one of a user associated with said particular electronic calendar and another user requesting that said user associated with said particular electronic calendar participate in said new event with at least one other user.

4. The method according to claim 1, further comprising:
displaying by said calendar controller a graphical representation of said particular electronic calendar depicting said fixed event with a first graphical attribute representing fixed events and said flexible event with a second graphical attribute representing flexible events and a third graphical attribute distinguishing said particular time period.

5. The method according to claim 1, further comprising:
triggering by said calendar controller said graphical interface for said user to enter said flexible event further comprising a minimum blocking size;
scheduling by said calendar controller in said particular electronic calendar said flexible event according to said minimum blocking size, wherein said minimum blocking size specifies a minimum time period for each separate time slot set for said flexible event if said flexible event is divided into multiple separate time slots within said particular time period.

6. The method according to claim 1, further comprising:
responsive to said calendar controller detecting a request for a new event for an additional time slot overlapping said second time slot, determining whether there is a contiguous time slot of said particular duration during said particular time period for said at least one other time slot;
responsive to said calendar controller detecting the lack of said contiguous time slot, determining whether there are a plurality of available time slots cumulatively of said particular duration during said particular time period for said at least one other time slot; and responsive to said calendar controller detecting said plurality of available time slots, repositioning said duration of said flexible event across said plurality of available time slots.

7. A system for managing scheduling of an electronic calendar, comprising:

a calendar controller executing on a processor of a computer system for triggering a graphical interface for a user to enter a flexible event comprising a title of said flexible event, a particular time period for said flexible event, a particular duration for said flexible event, a priority level for said flexible event wherein said priority level specifies a numerical priority and a deadline for said flexible event to remain in a reschedule queue;

at least one electronic calendar scheduled by said calendar controller with at least one fixed event requiring a first time slot on a particular day and said flexible event flexible for scheduling over said particular time period for said particular duration, wherein said particular time period is greater than said particular duration;

said calendaring controller for setting said flexible event within said electronic calendar at a second time slot within said particular time period for said particular duration; and said calendar controller, responsive to detecting a request for a new event for an additional time slot overlapping said second time slot, for determining by said calendar controller whether there is available time for at least one other time slot within said particular time period for said duration of said flexible event;

said calendar controller, responsive to detecting a lack of available time for said at least one other time slot, for comparing said priority level assigned to said flexible event with another priority level assigned to said new event;

said calendar controller, responsive to detecting said priority level assigned to said flexible event is less than another priority level assigned to said new event, for placing by said calendar controller said flexible event in said rescheduling queue to enable scheduling said new event during said additional time slot and rescheduling said flexible event during a new time period;

said calendar controller, responsive to detecting an available time for said at least one other time slot before said deadline passes, for automatically repositioning by said calendar controller said flexible event to said at least one other time slot of said particular duration during said particular time period to allow for scheduling said new event during said additional time slot; and said calendar controller, responsive to only detecting an available time for said at least one other time slot once said deadline passes, converting said flexible event in said rescheduling queue into a fixed type of event for an additional particular day at a particular time and automatically placing said flexible event in said electronic calendar on said additional particular day at said particular time.

8. The system according to claim 7, said calendaring controller further comprising:

means for receiving said new event from another user, wherein said new event requests said user associated with said electronic calendar participate in a meeting with at least one additional user.

9. The system according to claim 7, said calendaring controller further comprising:

means for receiving said new event at a server maintaining a plurality of electronic calendars, including said electronic calendar, from at least one of a user associated with said electronic calendar and another user requesting that said user associated with said electronic calendar participate in said new event with at least one other user.

10. The system according to claim 7, said calendaring controller further comprising:

means for displaying a graphical representation of said electronic calendar depicting said fixed event with a first graphical attribute representing fixed events and said flexible event with a second graphical attribute representing fixed events and a third graphical attribute distinguishing said particular time period.

11. The system according to claim 7, said calendaring controller further comprising:

means for triggering said graphical interface for said user to enter said flexible event further comprising a minimum blocking size;

means for scheduling in said electronic calendar said flexible event according to said minimum blocking size, wherein said minimum blocking size specifies a minimum time period for each separate time slot set for said flexible event if said flexible event is divided into multiple separate time slots within said particular time period.

12. The system according to claim 7, said calendaring controller further comprising:

means, responsive to detecting a request for a new event for an additional time slot overlapping said second time slot, for determining whether there is a contiguous time slot of said particular duration during said particular time period for said at least one other time slot;

means, responsive to detecting the lack of said contiguous time slot, for determining whether there are a plurality of available time slots cumulatively of said particular duration during said particular time period for said at least one other time slot; and means, responsive to detecting said plurality of available time slots, for repositioning said duration of said flexible event across said plurality of available time slots.

13. The system according to claim 7, said calendaring controller further comprising:

means, responsive to detecting a request for a new event for an additional time slot overlapping said second time slot, for determining whether there is available time for said at least one other time slot within said particular time period for said duration of said flexible event; and means, responsive to detecting a lack of available time for said at lest one other time slot, for determining whether said flexible event is of a priority less than said new event; and means, responsive to detecting said flexible event is of a priority less than said new event, for placing said flexible event in a rescheduling queue to enable scheduling said new event during said additional time slot.

14. A program for managing scheduling of an electronic calendar, said program embodied in a computer-readable storage medium, said program comprising computer-executable instructions which cause a computer to perform the steps of:

triggering a graphical interface for a user to enter a flexible event comprising a title of said flexible event, a particular time period for said flexible event, a particular duration for said flexible event, a priority level for said flexible event wherein said priority level specifies a numerical priority and a deadline for said flexible event to remain in a reschedule queue;

scheduling in a particular electronic calendar at least one fixed event requiring a first time slot on a particular day and said flexible event flexible for scheduling over said particular time period for said particular duration, wherein said particular time period is greater than said particular duration;

setting said flexible event at a second time slot within said particular time period for said particular duration; and responsive to detecting a request for a new event for an additional time slot overlapping said second time slot, determining whether there is available time for at least one other time slot within said particular time period for said duration of said flexible event;

responsive to detecting a lack of available time for said at least one other time slot, comparing said priority level assigned to said flexible event with another priority level assigned to said new event;

responsive to detecting said priority level assigned to said flexible event is less than another priority level assigned to said new event, placing said flexible event in said rescheduling queue to enable scheduling said new event during said additional time slot and rescheduling said flexible event during a new time period;

responsive to detecting an available time for said at least one other time slot before said deadline passes, automatically repositioning flexible event to said at least one other time slot of said particular duration during said particular time period to allow for scheduling said new event during said additional time slot; and responsive to only detecting an available time for said at least one other time slot once said deadline passes, converting said flexible event in said rescheduling queue into a fixed type of event for an additional particular day at a particular time and automatically placing said flexible event in said electronic calendar on said additional particular day at said particular time.

15. The program according to claim 14, said program further comprising computer-executable instructions which cause a computer to perform the step of:

receiving said new event from another user, wherein said new event requests said user associated with said particular electronic calendar participate in a meeting with at least one additional user.

16. The program according to claim 14, said program further comprising computer-executable instructions which cause a computer to perform the step of:

displaying a graphical representation of said particular electronic calendar depicting said fixed event with a first graphical attribute representing fixed events and said flexible event with a second graphical attribute representing fixed events and a third graphical attribute distinguishing said particular time period.

17. The program according to claim 14, said program further comprising computer-executable instructions which cause a computer to perform the step of:

triggering by said calendar controller said graphical interface for said user to enter said flexible event further comprising a minimum blocking size;

scheduling in said particular electronic calendar said flexible event according to said minimum blocking size, wherein said minimum blocking size specifies a minimum time period for each separate time slot set for said flexible event if said flexible event is divided into multiple separate time slots within said particular time period.

18. The program according to claim 14, said program further comprising computer-executable instructions which cause a computer to perform the step of:

responsive to detecting a request for a new event for an additional time slot overlapping said second time slot, determining whether there is a contiguous time slot of said particular duration during said particular time period for said at least one other time slot;

responsive to detecting the lack of said contiguous time slot, determining whether there are a plurality of available time slots cumulatively of said particular duration during said particular time period for said at least one other time slot; and responsive to detecting said plurality of available time slots, repositioning said duration of said flexible event across said plurality of available time slots.

19. The program according to claim 14, said program further comprising computer-executable instructions which cause a computer to perform the step of:

responsive to detecting a request for a new event for an additional time slot overlapping said second time slot, determining whether there is available time for said at least one other time slot within said particular time period for said duration of said flexible event;

responsive to detecting a lack of available time for said at lest one other time slot, determining whether said flexible event is of a priority less than said new event; and responsive to detecting said flexible event is of a priority less than said new event, placing said flexible event in a rescheduling queue to enable scheduling said new event during said additional time slot.

* * * * *